United States Patent [19]

Voss

[11] 4,360,772
[45] Nov. 23, 1982

[54] GENERATOR VOLTAGE REGULATOR

[75] Inventor: Richard J. Voss, Kokomo, Ind.

[73] Assignee: General Motors Corporation, Detroit, Mich.

[21] Appl. No.: 254,307

[22] Filed: Apr. 15, 1981

Related U.S. Application Data

[62] Division of Ser. No. 49,320, Jun. 18, 1979, Pat. No. 4,277,738.

[51] Int. Cl.³ .............................................. H02J 7/24
[52] U.S. Cl. ..................................... 322/28; 322/99; 320/48
[58] Field of Search ...................... 322/28, 99; 320/64, 320/68, 48

[56] References Cited

U.S. PATENT DOCUMENTS

| | | | |
|---|---|---|---|
| 3,023,354 | 2/1962 | Hillman | 322/25 |
| 3,343,059 | 2/1967 | Kirk et al. | 320/39 |
| 3,469,168 | 2/1969 | Harland et al. | 320/64 |
| 3,496,443 | 2/1970 | Snedeker | 320/39 |
| 3,597,654 | 8/1971 | Harland, Jr. et al. | 320/64 X |
| 3,599,079 | 8/1971 | Ansbro | 320/36 X |
| 3,624,482 | 11/1971 | Ruff | 320/48 |
| 3,656,135 | 4/1972 | Ruff | 340/249 |
| 3,718,849 | 2/1973 | Nolan et al. | 320/61 |
| 3,781,633 | 12/1973 | Iwaki et al. | 320/48 |
| 3,866,103 | 2/1975 | Taguchi | 320/64 |
| 3,942,096 | 3/1976 | Itoh et al. | 322/28 |
| 3,942,097 | 3/1976 | Itoh et al. | 322/28 |
| 3,967,186 | 6/1976 | Adams | 322/28 |
| 4,000,463 | 12/1976 | Sheldrake et al. | 322/99 X |
| 4,019,120 | 4/1977 | Fattic | 322/28 |
| 4,023,089 | 5/1977 | Arakane | 322/28 |
| 4,041,369 | 8/1977 | King et al. | 322/99 X |

Primary Examiner—R. J. Hickey
Attorney, Agent, or Firm—C. R. Meland

[57] ABSTRACT

A voltage regulator for the battery charging generator of a motor vehicle battery charging system. The regulator is capable of detecting various fault conditions and under certain conditions will latch a fault indicator to a latched energized state. The regulator utilizes a Zener diode as a voltage reference and is arranged to accommodate Zener diodes of varying break down voltages by trimming a resistor of the regulator voltage sensing circuit. The regulator includes an internal voltage regulating device having a regulated output voltage applied to fault detecting comparators. The output voltage of the internal regulating device is a function of the particular break down voltage of the Zener diode.

2 Claims, 2 Drawing Figures

Fig. 1

GENERATOR VOLTAGE REGULATOR

This application is a division of application Ser. No. 049,320, filed June 18, 1979 and now .S. Pat. No. 4,277,738.

This invention relates to a voltage regulating system for a motor vehicle battery charging system which has the capability of indicating various fault conditions such as low charging voltage, high charging voltage and various other faults in the battery charging system.

One type of voltage regulator system for the diode-rectified alternating current generator of a motor vehicle battery charging system utilizes three auxiliary diodes, sometimes referred to as a diode trio, connected with the AC input terminals of the main bridge rectifier that supplies charging current to the battery. The three auxiliary diodes, together with the negative diodes of the main bridge rectifier, provide a direct voltage which is utilized to energize the field of the alternating current generator through a field current controller of a voltage regulator. This general type of system is disclosed in the U.S. Pat. Nos. to Cheetham et al., 3,538,362 and to Harland, Jr. et al., 3,469,168.

One of the objects of this invention is to provide a battery charging system of the type described wherein the system includes means for indicating that the voltage across the battery is too high or too low. The system can also indicate that the direct field energizing voltage from the auxiliary diodes that supplies the field winding is either greater than a predetermined value or less than a predetermined value. In addition, the voltage regulating system of this invention includes means for limiting the field energizing voltage to a value that will not destroy the regulator when the field energizing voltage supplied by the auxiliary diodes, or diode trio, exceeds some predetermined value. Further, the system is arranged such that if the sensing circuit of the generator voltage regulator becomes disconnected from the battery the field current controller of the regulator cannot be biased conductive to thereby prevent the development of a field energizing voltage.

Another object of this invention is to provide a fault indicating system which includes means for sensing field current and battery voltage and which only operates to indicate a low battery charging voltage condition when the battery voltage drops to some predetermined value and when the field current drops below a predetermined value. This improves the fault indicating capability of the voltage regulating system since it makes it possible to distinguish between a true fault and a condition where the voltage applied to the battery may be low for a reason other than a fault. Thus, during an idling condition of the motor vehicle engine, coupled with a heavy electrical load on the charging system, the battery voltage may go low. This low voltage condition is not due to a fault and is therefore not indicated. No fault indication occurs because under the condition described field current will not drop below the predetermined value.

Still another object of this invention is to provide a voltage regulator for a battery charging generator which can accommodate Zener diodes having varying break down voltage magnitudes. To this end, the regulator includes an internal voltage regulator that operates to provide a regulated voltage to under and over voltage comparators of the voltage regulator. The magnitude of the output voltage of the internal regulator is set by the break down voltage of a Zener diode that is connected to the internal regulator and the Zener diode provides a reference voltage for the over and under voltage comparators and a regulation comparator. As a practical matter the magnitude of the break down voltage of a group of manufactured Zener diodes may not be the same but the regulator must accommodate the particular Zener diode it uses. The regulator includes a resistive voltage dividing sensing circuit and the system, including the internal regulator and Zener diode, is arranged such that the trimming of a resistor of the voltage divider will properly adjust the voltage set points of the comparators in regard to the particular voltage break down magnitude of the Zener diode used in the regulator.

A further object of this invention is to provide a generator voltage regulating system wherein the system responds properly with changes in temperature. The system includes means for sensing battery voltage and a Zener diode for providing a reference voltage. The battery and Zener reference voltages are compared in order to control field current and for operating certain fault indicator comparators. The system is arranged such that the voltage developed that represents battery voltage and the Zener voltage both vary in the same direction with changes in temperature.

Still another object of this invention is to provide a voltage regulator that has a latch and latch control circuit which is operative under certain fault conditions to latch a fault indicator, such as an indicator lamp, to an energized condition.

Figure 1:
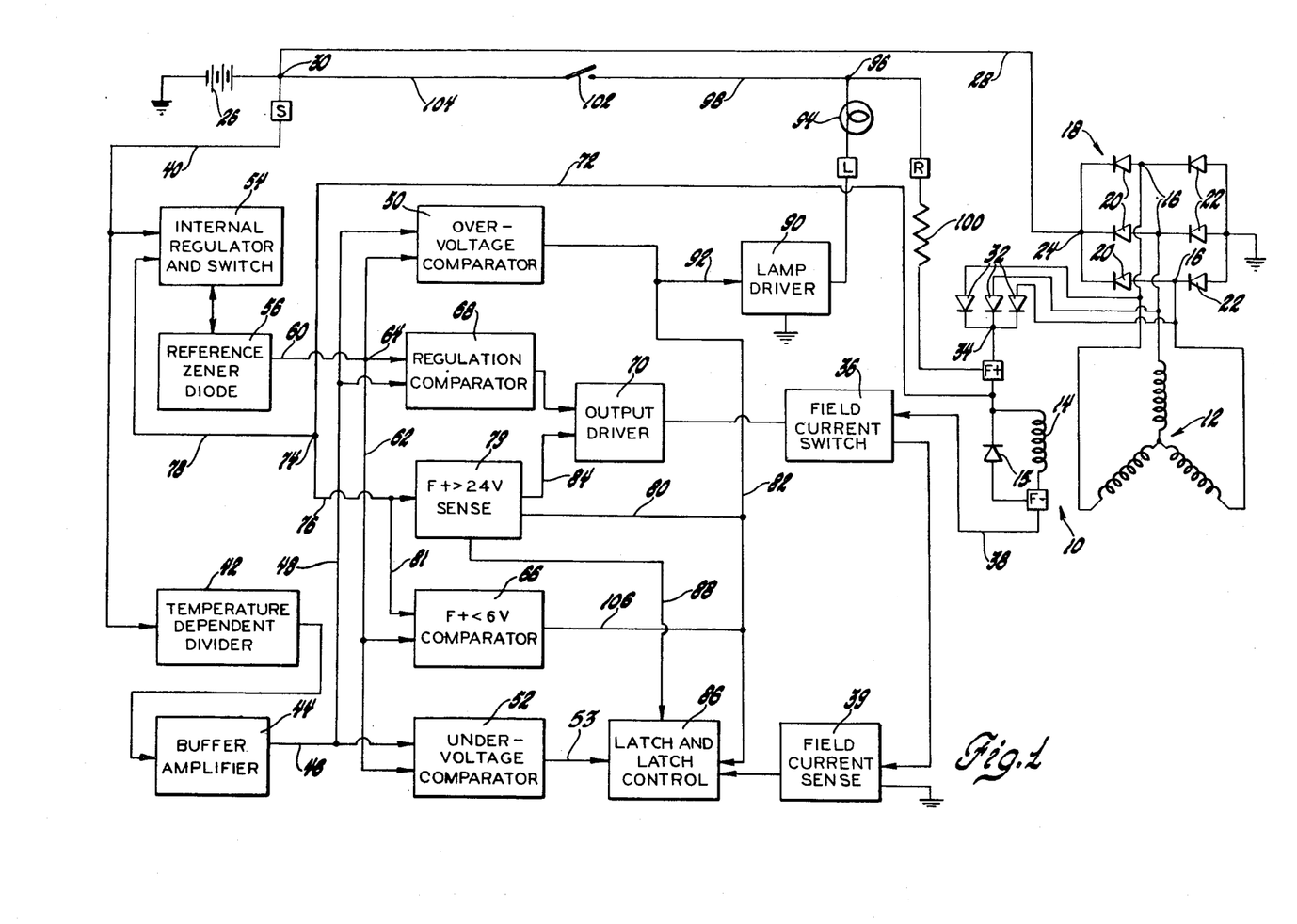
FIG. 1 is a schematic circuit diagram partially in block diagram form illustrating a motor vehicle battery charging system including the voltage regulating and fault indicating system of this invention.

Referring now to the drawings and more particularly to FIG. 1, the reference numeral 10 generally designates an alternating current generator which is driven by the engine of a motor vehicle. The generator has a three phase Y-connected output winding 12 and a field winding 14. The three phase output winding 12 may be delta connected rather than Y-connected. A field discharge diode 15 is connected across field winding 14. The three phase winding 12 is connected with the AC input terminals 16 of a three phase full-wave bridge rectifier generally designated by reference numeral 18. The bridge rectifier 18 is comprised of three positive silicon diodes 20 and three negative silicon diodes 22. The anodes of diodes 22 are commonly connected to ground whereas the cathodes of diodes 20 are connected to a direct voltage output terminal 24. The terminals 24 and ground provide direct voltage output terminals and they are connected across a motor vehicle battery 26. To this end a power supply conductor 28 is connected to junction 30 and this junction is connected to the positive terminal of the storage battery 26.

Field power for energizing the field winding 14 is supplied by three auxiliary diodes 32 which are sometimes referred to as a diode trio. The anodes of diodes 32 are connected to the AC input terminals of the bridge rectifier 18 whereas the cathodes of these diodes are connected to a junction 34. The junction 34 is connected to a field terminal designated F+ of the voltage regulator and to one side of field winding 14 through the F+ terminal. The opposite side of the field winding 14 is connected to a regulator field terminal designated F—. The F— terminal is connected to one side of a field current switch 36 by a conductor 38. The opposite side of field current switch 36 is connected to ground through a current sensing resistor to be described that forms a part of a field current sensing circuit 39. With the arrangement described a direct field energizing voltage appears between the F+ terminal and ground which is provided by the three auxiliary diodes 32 and the three negative diodes 22. When field current switch 36 is conductive, a current path is provided for energizing field winding 14 from the positive terminal 34, through field terminal F+, through field winding 14, field terminal F—, conductor 38, through the field current switch 36 and then through current sensor 39 to ground. As will be more fully described, the field current switch 36 switches on and off to control the voltage of the generator to thereby regulate the voltage appearing between junction 30 and ground to a desired regulated value.

The switching of the field current switch 36 is controlled so as to maintain the voltage between junction 30 and ground which is the charging voltage for the battery at a predetermined regulated value which varies with temperature. To this end the junction 30 is connected to a sensing terminal S of the voltage regulator and this terminal is in turn connected to a conductor 40. The conductor 40 is connected to a temperature dependent voltage divider 42 and this divider is connected to a buffer amplifier 44 which supplies a voltage to conductor 46 which is a function of the voltage between junction 30 and ground as modified by temperature. The temperature dependent divider 42 operates to increase the voltage supplied to buffer amplifier 44 as the temperature of the voltage regulator increases. The conductor 46 is connected to line 48 and this line provides a voltage input to over-voltage comparator 50 and under-voltage comparator 52 and regulation comparator 68. The conductor 40 is also connected to an internal regulator and switch designated by reference numeral 54. The block 54 is connected to a reference Zener diode 56 and the output from the reference Zener diode is applied to line 60. The line 60 is connected to line 62 at junction 64. The line 62 is connected to the over-voltage comparator 50, the under-voltage comparator 52, regulation comparator 68 and a comparator 66 which compares the voltage on line 62 with the voltage at junction 34 and operates to indicate when the voltage at junction 34 is less than the voltage on conductor 62. The comparator 66 has been labeled to indicate that the comparator 66 is operated when the F+ voltage is less than approximately 6 volts.

The regulation comparator 68 controls the switching of the field current switch 36 to thereby regulate the output voltage of the system. The reference Zener diode voltage on conductor 60 is applied as one input to the regulation comparator 68 and the other input to this comparator is applied from conductor 48 which has a voltage representing the voltage at junction 30. The output of the regulation comparator is applied to an output driver 70 which in turn controls the switching of the field current switch 36. Thus, when the voltage on conductor 48 exceeds the voltage on conductor 60, the regulation comparator 68 controls the output driver 70 to cause the field current switch to shut off. As the output voltage of the system now decreases the voltage on conductor 48 will decrease and when this voltage drops a predetermined amount the regulation comparator 68 operates the driver 70 to cause field current switch 36 to turn on. The field current switch 36 therefore switches on and off to maintain the voltage at junction 30 at the desired regulated value.

The F+ terminal, which has a voltage which is the same as the voltage at junction 34, is connected to line 72. This line is connected to junction 74 which in turn is connected to lines 76 and 78. When the generator is developing an output voltage, the line 72 applies a direct voltage to the internal regulator and switch 54 via line 78, to comparator 66 via line 81 and to a voltage sensing circuit designated by reference numeral 79 via line 76. The voltage sensing circuit 79 responds to a voltage at the F+ terminal in excess of a predetermined value, for example 24 volts in a 12 volt system. One output from the circuit 79 is line 80 connected to line 82. Another output from sensing circuit 78 is line 84. The sensing circuit 79 is further connected to a latch and latch control circuit 86 via the line 88. When the voltage at the F+ terminal exceeds 24 volts, the output on line 84 controls the output driver 70 to control field current to a value that will limit the field energizing voltage appearing between the F+ terminal and ground to a value, for example 24 volts, that will not destroy the components of the regulator connected between the F+ terminal and ground. In addition, the output on line 80 will energize the line 82 which is connected to a lamp driver 90 on line 92. Further, a signal is applied to the latch and latch control circuit 86 from sensing circuit 79 via the line 88, the purpose of which will be described. The under-voltage comparator 52 is coupled to latch and latch control 86 by line 53.

The signal indicator for indicating various fault conditions in the system takes the form of a signal lamp 94 connected between junction 96 and a lamp terminal L of the voltage regulator. The junction 96 is connected to a conductor 98 which is also connected to a terminal designated R of the voltage regulator. A resistor 100 is connected between the R terminal and the F+ terminal of the voltage regulator. The conductor 98 is connected in series with a manually operable ignition switch 102 of the motor vehicle electrical system and the opposite side of this switch is connected to junction 30 by a conductor 104.

The lamp driver 90 controls the energization of lamp 94. When ignition switch 102 is closed, the lamp 94 can be energized from junction 30 provided that the lamp driver 90 forms a conductive path between light terminal L and ground. As will be described, the lamp driver 90 includes a transistor which is biased conductive to energize the lamp 94 under certain conditions of operation. The lamp driver 90 is connected to the over-voltage comparator 50, to output line 80 of the sensing circuit 79 and to the output of comparator 66 via line 106. Further, the lamp driver is connected to the latch and latch control circuit 86.

Figure 2:
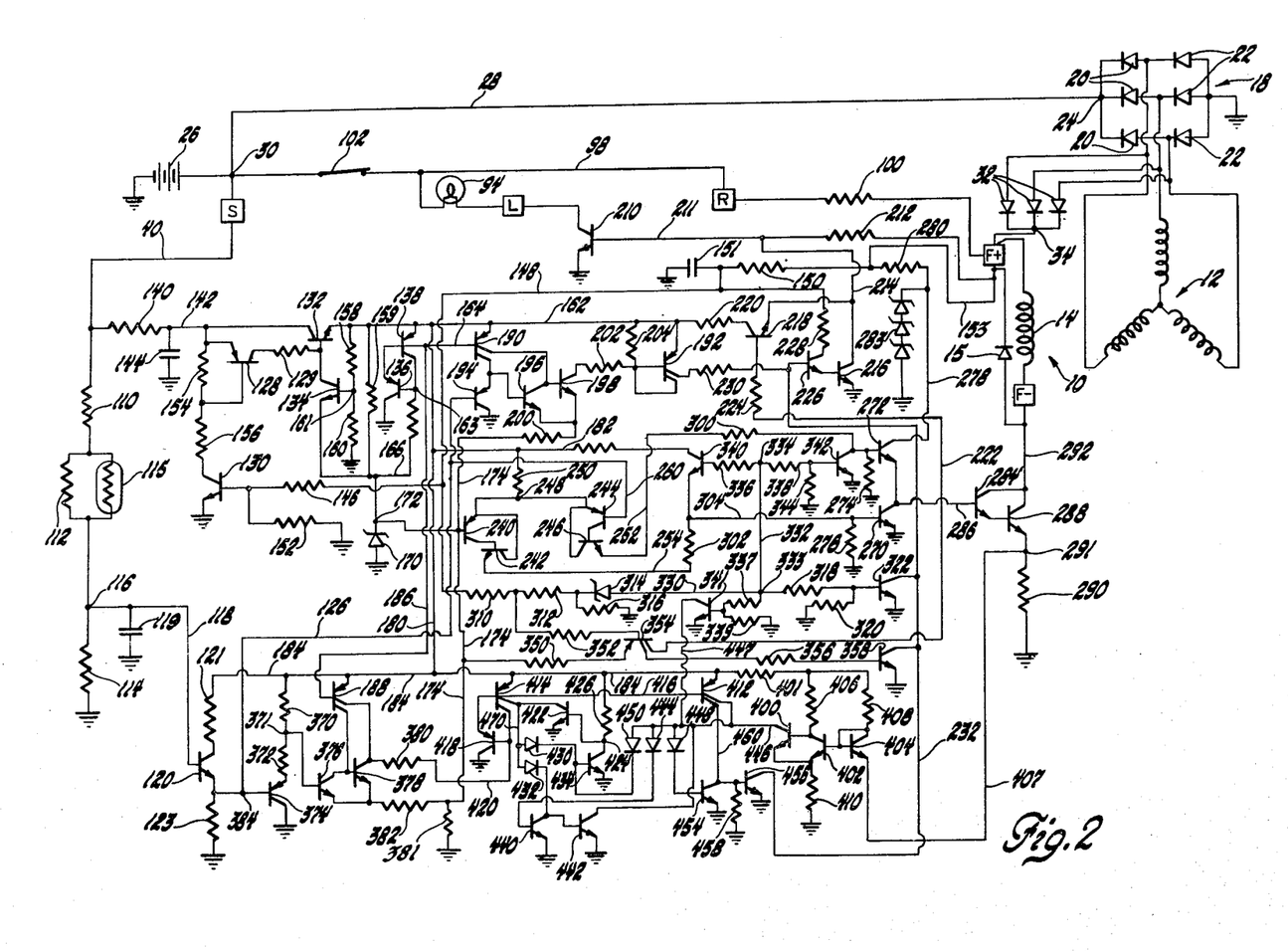
FIG. 2 is a schematic circuit diagram of the system illustrated in FIG. 1 but illustrating specific circuitry for the block diagram components shown in FIG. 1.

Referring now to FIG. 2, the detailed circuitry for the blocks of FIG 1 and illustrated and will now be described. In describing FIG. 2 the same reference numerals as were used in FIG. 1 have been utilized to identify corresponding elements in each figure.

The temperature dependent divider 42 is comprised of resistors 110, 112 and 114. The resistor 112 is connected in parallel with a negative temperature coefficient of resistance thermistor 115. The circuit just described forms a voltage divider which is connected between the S terminal of the regulator and ground and therefore between junction 30 and ground. At such this voltage divider develops a voltage that is a function of the voltage appearing between junction 30 and ground which is the charging voltage for battery 26. This voltage divider is made up of relatively high value resistors and is permanently connected across the battery as illustrated. In a 12 volt system resistor 110 can have a value of 5,000 ohms, resistor 112 can be 5,000 ohms and resistor 114 can be 10,000 ohms. The negative temperature coefficient of resistance thermistor 115 can have a range of resistance of 20 to 25 thousand ohms with the resistance decreasing in the range with increasing temperature. Because of the high resistance of the voltage divider there is little or no battery discharge through the voltage divider when the motor vehicle system is shut down.

The voltage at junction 116 on the voltage divider will vary as a function of the output voltage of the generator 10 and as the temperature of the voltage regulator varies. As the temperature of the regulator increases the resistance of thermistor 115 decreases and as a result the voltage at junction 116 will increase for a given voltage applied between junction 30 and ground. As the temperature of the regulator decreases the resistance of thermistor 115 increases and the voltage at junction 116 will decrease for a given voltage on junction 30. In summary, the voltage divider ratio varies with temperature so as to vary the voltage at junction 116 with temperature and the net result is that the battery charging voltage at junction 30 will be maintained at a higher regulated value at colder temperatures than at warmer temperatures.

The voltage divider can be modified such that a resistor (not illustrated) of approximately 5,000 ohms is connected in series with thermistor 115 with the series combination of the resistor and thermistor 115 connected across resistor 112. This will result in a relatively flat response of the voltage divider at high temperature of the regulator.

The junction 116 is connected to a conductor 118. A capacitor 119 is connected between conductor 118 and ground. The conductor 118 is connected to the base of NPN transistor 120 which forms a buffer amplifier. The emitter of this transistor is connected to ground through a resistor 123 whereas the collector of this transistor is connected to conductor 184 through resistor 121. The emitter of transistor 120 is connected to the base of a transistor 374 and to a conductor 126 at junction 384.

The transistor 120, together with the resistors 121 and 123, connected respectively to its collector and emitter, form a buffer amplifier corresponding to the block 44 shown in FIG. 1. The purpose of this buffer amplifier is to eliminate loading of the voltage divider 42 and this is accomplished since transistor 120 is connected as an emitter follower with consequent high input impedance.

The voltage on junction 384 and conductor 126 is the emitter voltage of transistor 120. This voltage varies with variation in the voltage of junction 116 and is lower than the voltage of junction 116 by the amount of voltage drop $V_{be}$ across the base-emitter of transistor 120. The $V_{be}$ voltage drop of transistor 120 varies with change in temperature of the regulator. As regulator temperature increases $V_{be}$ of transistor 120 decreases with the result that the voltage on junction 384 increases due to the reduced $V_{be}$ voltage drop. The voltage on conductor 126 is compared with the reference Zener diode voltage in various portions of the circuit of the regulator as will be more fully described hereinafter and the varying $V_{be}$ voltage drop of transistor 120 with temperature is used to offset the positive temperature dependent characteristic of the Zener diode that provides the Zener reference voltage in a manner more fully described hereinafter.

The internal regulator and switch, designated by reference numeral 54 in FIG. 1, is comprised of transistors 128, 130, 132 and 134. The input to this circuit is from conductor 40 and comprises a resistor 140 and conductor 142. A capacitor 144 is connected between the conductor 142 and ground.

In regard to the switching function of circuit 54, the base of NPN transistor 130 is connected to a resistor 146 and to one side of resistor 152 the opposite side of which is grounded. The resistor 146 is connected to a conductor 148 which in turn is connected to the F+ terminal through resistor 150 and conductor 153. A capacitor 151 is connected between conductor 148 and ground.

The F+ terminal is connected to one side of resistor 100 and to junction 34.

When switch 102 is closed, prior to starting the vehicle engine, battery voltage is applied to the F+ terminal through the resistor 100. As will be more fully described, transistors 284 and 288 are now biased conductive so that field winding 14 is energized from battery 26. With a 12 volt system the voltage drop between the F+ terminal and ground is approximately 3 volts. This voltage is applied to resistors 146 and 152 and is high enough to cause transistor 130 to be biased conductive. When the engine is running and driving the generator a voltage is developed at junction 34 by diodes 32 which is sufficient to maintain transistor 130 conductive. When switch 102 is opened, to shut down the engine that drives the generator, the voltage at junction 34 will drop below a value required to maintain transistor 130 conductive with the result that transistor 130 becomes biased nonconductive.

When transistor 130 is biased conductive, current can flow through resistors 154 and 156 and the voltage developed across resistor 154, which is connected across the emitter and base of PNP transistor 128, forward biases transistor 128 in its emitter-collector circuit. The conduction of transistor 128 applies a forward bias to series NPN regulating transistor 132 through resistor 129. The emitter of transistor 132 is connected to conductor 162 and its collector is connected to conductor 142. The conduction of transistor 132 is controlled by the conduction of NPN transistor 134 and it has its conduction controlled by the relative voltages of its base and emitter. The base voltage of transistor 134 is determined by a voltage divider comprised of resistors 158 and 160 since it is connected to a junction 161 of these resistors. The emitter of transistor 134 is connected to conductor 166 and a Zener diode 170 is connected between conductor 166 and ground. A resistor 159 of approximately 6,000 ohms is connected between conductors 162 and 166 to form a current path feeding the Zener diode 170. The current supplied to Zener diode 170 is a magnitude of 0.5 to 1 milliamps to bias the Zener diode to a stable point of operation. The emitter voltage of transistor 134 corresponds to the break down voltage of Zener diode 170. This break down voltage increases with temperature but this effect is offset by the decreasing voltage drop $V_{be}$ of the base-emitter circuit of transistor 134 with increasing regulator temperature. As the output voltage on conductor 162 increases beyond a desired regulated value, the conduction of transistor 134 is increased thereby reducing the base voltage of transistor 132 resulting in decreased conduction of transistor 132. This reduces the voltage on conductor 162 and the operation is such that conduction of transistor 132 is controlled so that the voltage on conductor 162 is maintained substantially constant at a value of approximately 8.2 volts in the 12 volt battery charging system when the break down voltage of Zener diode 170 is approximately 6 volts. The magnitude of output voltage on conductor 162 depends on the magnitude of the break down voltage of Zener diode 170 and this break down voltage may vary from one Zener diode to another. This is more fully described hereinafter.

The regulator of this invention includes a PNP transistor 138 having a base connected to a conductor 164 and to the emitter of a PNP transistor 136. The collector of transistor 138 is connected to the base of transistor 136 at junction 163 and a resistor is connected between this junction and conductor 166. As previously mentioned, Zener diode 170 is connected between the conductor 166 and ground. The junction 172, connected to the cathode of Zener diode 170, will have a voltage relative to ground equal to the break down voltage of the Zener diode which may be equal for example approximately 6 volts. This voltage will be constant except for a slight temperature dependent variation due to changes in the temperature of the regulator. The Zener reference voltage 56, shown in FIG. 1, corresponds to the voltage between junction 172 and ground. Junction 172 is connected to conductor 174. As will be more fully pointed out hereinafter, this reference voltage is applied to various elements of the system and compared with the voltage on conductor 126 to regulate the output of the generator and to also provide various fault indications.

The regulated voltage on conductor 162 is applied to a conductor 180 which feeds conductors 182 and 184. The voltage on conductor 164, provided by the connection to the base of transistor 138, is applied to the base of duel collector PNP transistor 190 and to a conductor 186 which is connected to the base of a duel collector PNP transistor 188. Transistor 138, although illustrated as having one collector, is a dual collector PNP lateral transistor in which the collectors are tied together. The emitter of transistor 136 is connected to the base of transistor 138 and the base of transistor 136 and collectors of transistor 138 are connected to junction 163. An increase in collector current of transistor 138 will result in an increase in voltage of junction 163 and a decrease in collector current of transistor 138 will result in a decrease in voltage of junction 163. This will vary the conduction of transistor 136 in such a manner as to maintain the collector current and base voltage of transistor 138 substantially constant. This means that the voltage of conductors 164 and 186 remain constant and, as pointed out, these conductors are connected respectively to the base of transistor 190 and base of transistor 188.

The over-voltage comparator 50 is comprised of the dual collector lateral PNP transistors 190 and 192, PNP transistor 194 and NPN transistors 196 and 198. This over-voltage comparator compares the voltage on conductor 126, which is representative of the voltage applied to the battery 26, with the reference voltage provided at junction 172 by Zener diode 170. Thus, the base of transistor 194 is connected to conductor 126 and the emitter electrodes of transistors 196 and 198 are connected to the reference voltage on conductor through a resistor 200. The collector of transistor 198 is connected to the base of transistor 192 through resistor 202 and a resistor 204 connects the emitter and base of transistor 192. The base and one of the collector electrodes of transistor 192 are connected together. The collector current of the collectors of transistor 192 are substantially equal and these currents are maintained substantially constant by the feedback connection between one of the collectors and the base of transistor 192. The transistor 190 operates as a constant current source for transistors 194, 196 and 198.

When the voltage on conductor 126, which is a divided down representation of battery voltage, exceeds the reference voltage on conductor 174 by an amount indicative of an over-voltage condition the system should indicate to the driver that the battery is being overcharged. As one example, a voltage on junction 30 that is approximately 1.5 volts higher than the desired regulated value for a given temperature will cause an over-voltage indication. During this over-voltage condition of operation the emitter voltage of transistor 194 is increased relative to the emitter voltage of transistor 196 to a level sufficient to bias transistor 196 conductive which in turn biases transistor 198 nonconductive. With transistor 198 nonconductive the dual collector PNP transistor 192 is biased nonconductive. This will cause the lamp 94 to be lit or energized in a manner which will now be described.

The lamp 94 is connected with the L terminal of the voltage regulator which in turn is connected to the collector of an NPN transistor 210. The base of transistor 210 is connected to conductor 211 and a resistor 212 is connected between conductor 211 and the F+ terminal of the regulator so that conductor 211 responds to the diode trio voltage on junction 34. The base of transistor 210 is also connected to a conductor 214 through conductor 211. Conductor 214 is connected to the collector of an NPN transistor 216. The conductor 214 is also connected to the emitter of an NPN transistor 218 which has its collector connected to conductor 162 through a resistor 220. The base of transistor 218 is connected to conductor 222 through a resistor 224. The base of transistor 216 is connected to the emitter of NPN transistor 226. The collector of transistor 226 is connected to conductor 148 through a resistor 228 while the base of transistor 226 is connected to one of the collector electrodes of transistor 192 through a resistor 230 and is further connected to conductor 232.

When the transistor 210 is conductive in its collector-emitter circuit the lamp 94 can be energized if switch 102 is closed. When transistor 216 conducts in its collector-emitter circuit base drive current for transistor 210 is shunted away from transistor 210 to bias it nonconductive. Transistors 226 and 216 may be biased conductive when transistor 192 is conductive thereby maintaining the lamp 94 deenergized. In addition, it can be seen that when transistor 218 conducts the transistor 210 is forward biased conductive via conductor 214 and the base-emitter circuit of transistor 210. The conduction of transistor 218 is controlled by the voltage on conductor 222 and this voltage varies in a manner to be described hereinafter.

In summary, assuming that transistor 218 is nonconductive an over-voltage condition will cause normally conducting transistor 192 to be biased to a nonconductive condition thereby causing transistors 216 and 226 to be biased nonconductive which removes the shunt path from the base-emitter circuit of transistor 210 with the result that transistor 210 is biased to conduct to energize lamp 94 to indicate the over-voltage condition.

The regulation comparator 68 is comprised of lateral PNP transistors 240 and 244 and NPN transistors 242 and 246. The emitters of transistors 240 and 244 are connected to a junction 248 and this junction is connected to conductor 182 through a resistor 250. The emitter of transistor 246 is connected to conductor 252 whereas the emitter of transistor 242 is connected to conductor 254. The base of transistor 240 is connected to junction 172 and therefore to the Zener reference voltage. The base of transistor 244 is connected to conductor 126 via the conductor 260 so that the base of transistor 244 responds to a voltage representative of battery voltage on conductor 126. The emitter of transistor 240 is connected to the collector of transistor 242 and the collector of transistor 240 is connected to the base of transistor 242. Similar connections are made between transistors 244 and 246. The NPN transistors 242 and 246 increase the gain of the lateral PNP transistors 240 and 244.

The regulation comparator is connected to the output driver 70 which is comprised of NPN transistors 270 and 272. Resistors 274 and 276 respectively connect the base electrodes of transistors 272 and 270 to ground. The collector of transistor 272 is connected to the F+ terminal via conductor 278, resistor 280 and conductor 153. Three series connected protective Zener diodes 283, each having a break down voltage of approximately 7 to 8 volts, are connected between conductor 278 and ground. These diodes limit the voltage that can appear between conductor 278 and ground to a value that will not destroy components connected to line 278. The collector of transistor 270 is connected to the base of an NPN transistor 284 by conductor 286. Conductor 286 also connects the emitter of transistor 272 to the base of transistor 284. The transistor 284 has its collector connected to the collector of another NPN transistor 288 and it can be seen that the transistors 284 and 288 are connected in a Darlington configuration and are connected in series with a small value current sensing resistor 290 and in series with the field winding 14 via conductor 292. The resistor 290 may be approximately 0.01 ohms. The Darlington connected transistors 284 and 288 form the field current switch 36 shown in FIG. 1 and continuously switch on and off in a manner to be described to switch the current on and off in the field winding 14 that is supplied by the voltage developed between junction 34 and ground.

The base of transistor 272 is connected to the emitter of transistor 246 through a resistor 300. The emitter of transistor 242 is connected to the base of transistor 270 by a resistor 302 and conductor 304.

When the voltage on conductor 126 is higher than the reference voltage on conductor 174 by a predetermined amount the regulation comparator 68 causes transistor 246 to be biased nonconductive and transistor 242 conductive. Under this condition of operation the emitter voltage of conducting transistor 242 is applied to the base-emitter circuit of transistor 270 through resistor 302, conductor 304 and resistor 276 to cause transistor 270 to conduct. Conducting transistor 270 shunts the base-emitter circuit of transistors 284 and 288. At the same time transistor 246 is biased nonconductive to thereby hold the transistor 272 biased nonconductive. Accordingly, base drive that could otherwise be supplied by transistor 272 to transistors 284 and 288 via conductor 286 is cut off and the conduction of transistor 270 further ensures that transistors 284 and 288 are switched off. Thus, as the voltage at junction 30 rises to a predetermined value the transistors 284 and 288 are biased nonconductive to shut off field current. As the output voltage of the system now drops the voltage on conductor 126 drops and at some predetermined value the regulation comparator will now cause transistors 288 and 284 to conduct. During this mode of operation transistor 246 is biased conductive and its collector-emitter current provides base drive for the base-emitter circuit of transistor 272 to bias it conductive. At the same time transistor 242 is biased nonconductive removing base drive from transistor 270 causing it to be in a nonconductive state where it does not shunt the base-emitter circuit of transistors 284 and 288. As a result transistors 284 and 288 are biased conductive to cause field current to be supplied to field winding 14. The system under normal operation continues to cause transistors 284 and 288 to switch on and off to maintain a desired regulated voltage between junction 30 and ground.

In regard to the operation of the regulation comparator, transistors 240 and 244 are connected to operate as a differential amplifier responsive to the voltages at junction 172 and conductor 260 with transistors 242 and 246 amplifying the output of a respective transistor 240 and 244. Although the differential amplifier provided by transistors 240 and 244 and associated circuitry is a linear responsive circuit it switches during operation of the regulator. Thus, the system is arranged such that a change of 50 to 100 millivolts at junction 30 will cause a switching action. However, the ripple voltage applied to junction 30, due to rectified alternating current, is of the order of 200 millivolts with the result that the differential amplifier comprised of transistors 240 and 242 is switched to one condition or the other. If transistor 240 is biased to conduct it causes transistor 242 to conduct since the emitter-collector circuit of transistor 240 is in series with the base-emitter circuit of transistor 242. The same mode of operation applies to transistors 244 and 246, when transistor 244 conducts transistor 246 is biased conductive. Further, either transistors 240 and 242 both conduct with transistors 244 and 246 both being nonconductive or vice versa. Thus, the emitters of both transistors have a regulated B+ voltage applied thereto from line 182, resistor 250 and junction 248. The base voltage of transistor 240 is the Zener voltage from junction 172 and the base voltage of transistor 244 is a divided down representation of battery voltage on line 126. When a voltage representative of battery voltage (conductor 126) exceeds the Zener reference voltage (conductor 174), which is the set point voltage of the regulator, the relative voltages at the emitter and base electrodes of transistors 240 and 244 are such as to bias transistor 244 nonconductive and transistor 240 conductive. When battery voltage drops below the Zener reference voltage transistor 244 is biased conductive and transistor 240 nonconductive.

The circuit 79 (FIG. 1) which operates when the voltage at junction 34, which is the F+ voltage, exceeds for example 24 volts is comprised of resistors 310, 312, a Zener diode 314, a resistor 316, resistors 318 and 320 and an NPN transistor 322. One end of the resistor 310 is connected to conductor 148 which in turn is connected to the F+ terminal through resistor 150. When the voltage at the F+ terminal exceeds a predetermined value, for example 24 volts in a 12 volt charging system, the Zener diode 314 becomes conductive to forward bias the transistor 322 in its collector-emitter circuit. The collector of transistor 322 is connected to conductor 232 which is coupled to the base of transistor 226. The net result of this is that during a condition where the F+ voltage exceeds 24 volts transistor 322 is biased conductive which in turn shuts off transistors 226 and 216 thereby removing the shunt from the base-emitter circuit of transistor 210 to cause the transistor 210 to conduct and therefore energize the signal lamp 94.

The condition where the F+ terminal voltage exceeds 24 volts will not occur as long as the regulation comparator 68 senses a rise in output voltage at junction 30 since it responds at the desired regulated voltage, for example 14 volts in a 12 volt system. However, if rectifier output terminal 24 should become inadvertently disconnected from junction 30 the regulation comparator 68 senses battery voltage which is too low to bias field current controlling transistors 284 and 288 nonconductive. Thus, the regulation comparator is biased to a condition causing continuous conduction of transistors 284 and 288 with a resultant uncontrolled full field current. If this condition were allowed to persist the voltage at junction 34 would rise to a value that would destroy components of the regulator connected thereto. In order to prevent this, the system limits the voltage at junction 34 relative to ground to a value (24 volts) which will not destroy components of the regulator. Thus, when the voltage at the F+ terminal exceeds 24 volts the transistors 284 and 288 are biased nonconductive to cut off field current. Thus, with Zener diode 314 conducting, a voltage is applied to conductors 330 and 332. The conductor 332 is connected to a junction 334 between resistors 336 and 338. The resistor 336 is connected to the base of NPN transistor 340 whereas the resistor 338 is connected to the base of NPN transistor 342. A resistor 344 connects the base of transistor 342 to ground. It will be evident that when the Zener diode 314 conducts both transistors 342 and 340 will be biased conductive. When transistor 340 is biased conductive it applies base drive to transistor 270 via conductor 304 to turn on transistor 270 and therefore drop the base voltage of transistors 284 and 288 toward ground. With transistor 342 conductive the base voltage of transistor 272 is reduced to a point where transistor 272 is biased nonconductive thereby cutting off base drive to the base-emitter circuits of transistors 284 and 288. As a result of this action transistors 284 and 288 are biased nonconductive to cutoff field current to the generator. The generator output voltage now decreases and the voltage at junction 34 decreases. When the voltage at junction 34 decreases to a point where Zener diode 314 assumes a nonconductive state transistors 284 and 288 are biased to a conductive state to again permit current to be supplied to field winding 14. Field current is therefore switched on and off to regulate the voltage at junction 34 to approximately 24 volts under the control of Zener diode 314 which senses the voltage between junction 34 and ground.

It is possible that the sensing terminal S of the voltage regulator may become inadvertently disconnected from junction 30 in which case no voltage is applied to conductor 40 or the input voltage divider 42 of the regulator from battery 26 or rectifier output terminal 24. This will not cause a continuous conduction of transistors 284 and 288, but on the contrary these transistors cannot now be biased conductive because no base voltage can be applied to the base of transistors 272 through resistor 300 via transistor 246 from conductor 162. Thus, with conductor 40 disconnected from junction 30 the supply of battery voltage to conductor 162 is cutoff. Therefore, under this condition of operation, transistors 284 and 288 are nonconductive to cutoff field current and the generator develops no output voltage.

It is noted that the conductor 332 is connected to a junction 333 and a pair of resistors 337 and 339 are connected between junction 333 and ground. The junction of the two resistors is connected to the base of NPN transistor 341 which has its emitter grounded and its collector connected to the latch and latch control circuit 86. This connection is represented by line 88 in FIG. 1. When the Zener diode 314 is biased to conduct it can be seen that the transistor 341 will be biased conductive in its collector-emitter circuit. The purpose of this will be more fully described hereinafter in connection with a description of the latch and latch control circuit.

The comparator 66, which operates when the F+ voltage drops below some predetermined value, for example 6 volts in a 12 volt charging system, is comprised of a resistor 350, resistor 352, a dual collector lateral PNP transistor 354, resistor 356 and an NPN transistor 358. The voltage applied to the emitter of transistor 354 is the Zener reference voltage of approximately 6 volts appearing on conductor 174. The voltage at the junction between resistors 310 and 312, which is applied to the base of transistor 354 through resistor 352, is proportional to the voltage appearing at the F+ terminal. When the voltage at the F+ terminal drops below approximately 6 volts the transistor 354 is biased conductive. One of the collector electrodes of transistor 354 is connected to resistor 356 and therefore when transistor 354 conducts transistor 358 will be biased to conduct and since its collector is connected to conductor 232 the voltage of conductor 232 goes low allowing signal lamp controlling transistor 210 to conduct. The other collector of transistor 354 is connected to conductor 222 which applies a forward bias to the base of transistor 218. This can apply direct voltage from conductor 162 to the base of transistor 210 ensuring that transistor 210 will be biased to conduct when the voltage at the F+ terminal drops below the 6 volt value.

When the ignition switch 102 is closed, and prior to starting the motor vehicle engine that drives alternating current generator 10, lamp 94 is energized to provide a lamp bulb check. When ignition switch 102 is closed, battery voltage is applied to the F+ terminal through resistor 100 which may have a resistance value of 20 ohms. The F+ terminal is connected to the base of transistor 130 by conductor 153, resistor 150, conductor 148, resistor 146 and resistor 152. Resistor 150 may be a 200 resistor while resistors 146 and 152 may have resistance values of 16 and 20 thousand ohms respectively. It should be noted at this point, that the closure of switch 102 causes field winding 14 to be initially excited from battery 26. Thus, transistors 284 and 288 will be biased to conduct and the battery can supply field current to field winding 14 through resistor 100.

The system is further arranged such that when switch 102 is closed, and the engine of the vehicle not running, a direct voltage provided by battery 26 is applied to the base of transistor 130 of sufficient magnitude to cause it to conduct and therefore allow transistor 132 to conduct to apply regulated battery voltage to conductor 162. During this condition of operation about 0.5 amps is supplied to field 14 and the voltage at the F+ terminal is approximately 3 volts. This is sufficient to cause transistor 130 to be biased conductive when applied to the base of transistor 130 through the circuit comprised of resistors 150, 146 and 152. The voltage applied to the base of transistor 354 from the F+ terminal is below 6 volts so that transistor 354 of the F+ under-voltage comparator 66 will be biased conductive. With transistor 354 conductive transistor 358 is biased to conduct, causing transistors 226 and 216 to be nonconductive thereby permitting base drive to the base of transistor 210. Further, with transistor 354 conducting transistor 218 is biased to conduct so that transistor 210 is biased to conduct from the emitter of transistor 218 and from resistor 212. Transistor 218 provides base current for transistor 210 in addition to that supplied by resistor 212 to assure energization of lamp 94. Accordingly, the lamp 94 is energized and field winding 14 excited before the engine is started. Under this condition of operation, base drive is supplied to the base-emitter circuits of transistors 284 and 288 to bias them conductive from battery 26, resistor 100, conductor 153, resistor 280 of approximately 400 ohms, collector-emitter of transistor 272 and conductor 286.

The under-voltage comparator 52 is comprised of resistors 370 and 372 having a junction 371, a PNP transistor 374, NPN transistors 376 and 378, resistors 380 and 382 and dual collector PNP transistor 188. The under-voltage comparator compares the voltage on conductor 174 (Zener reference voltage) with the voltage on conductor 126 (battery voltage) which is applied to the base of transistor 374 at junction 384. When the voltage on junction 30 drops below the desired regulated value, by an amount indicative of low battery voltage, the voltage on conductor 126 and junction 384 both drop to some predetermined value such that the conduction of transistor 374 is increased to a point where the voltage at junction 371, relative to the voltage on conductor 174, is not sufficient to bias transistor 376 conductive. As one example, if the regulator is set such as to maintain a given desired regulated voltage at junction 30, of for example 14 volts in a 12 volt system, a drop in voltage of junction 30 of approximately 0.8 volts to 13.2 volts will cause activation of the undervoltage comparator. This 0.8 volt drop is divided down in the voltage divider to approximately 0.4 volts at junction 116 which is sufficient to actuate the undervoltage comparator. The desired regulated value will change with temperature due to changes in the voltage divider ratio of the voltage divider connected between junction 30 and ground but regardless of the set desired regulated value the under-voltage comparator will be actuated by a drop in voltage of 0.8 volts at junction 30 from the desired regulated value. With transistor 376 nonconducting transistor 378 is biased to conduct lowering the voltage on conductor 420. This will bias the transistor 414 of the latch and latch control circuit 86 conductive, the effect of which is described hereinafter. When there is no under-voltage the voltage at junction 371 is such, relative to the voltage on conductor 174, to bias transistor 376 conductive. This biases transistors 378 and 414 nonconductive. The transistor 188 operates as a constant current source. A resistor 381 of approximately 8,000 ohms is connected between conductor 174 and ground.

The field current sensing circuit 39 comprises NPN transistors 400 and 402, NPN transistor 404 having its collector connected to its base and resistors 401, 406, 408 and 410. This circuit is connected between conductor 184 and ground with the emitter of transistor 404 being connected to junction 291 by conductor 407. The junction 291 is located between resistor 290 and the emitter of transistor 288.

As long as the field current which is sensed by resistor 290 is below a predetermined value, for example 2 amps in a 12 volt system, the voltage at junction 291 is such that the voltage at the base of transistor 402 is not sufficient to bias transistor 402 conductive with the result that transistor 400 is biased conductive. The voltage on the base of transistor 402 will vary with variation of voltage of the emitter of transistor 404 and that voltage depends on the voltage on junction 291 which in turn is a function of field current magnitude. When the field current passing through resistor 290 exceeds the predetermined value the voltage of junction 291 increases as does the voltage of the base electrodes of transistors 402 and 404 with the result that transistor 402 is biased conductive causing transistor 400 to be rendered nonconductive. In summary, it can be seen that transistor 400 is biased to conduct whenever the field current is below a predetermined value and is biased nonconductive when the field current is above the predetermined value.

The latch and latch control circuit 86 will now be described. This circuit comprises PNP double collector lateral transistors 412 and 414. The base electrodes of these transistors are connected to a conductor 416 whereas the emitters of these two transistors are connected to conductor 184. One of the collector electrodes of transistor 414 is connected to the base of PNP transistor 418 which has its collector grounded. The base of this transistor is further connected to conductor 420. The conductor 420 and the resistor 380 connect the undervoltage comparator and the latch and latch control circuit. The emitter of transistor 418 is connected to the base of transistor 414. The other collector of transistor 414 is connected to the collector of NPN transistor 422. The emitter of this transistor is grounded and its base is connected to junction 424 which is connected to line 184 through resistor 426. The collector of transistor 422 is connected to the anodes of diodes 430 and 432 by conductor 470. The cathode of diode 430 is connected to the base of NPN transistor 434. The cathode of diode 432 is connected to the collector of NPN transistor 440 and to the base of NPN transistor 442. The emitters of transistors 440 and 442 are grounded. The base of transistor 440 is connected to the cathode of a diode 444. The collector of transistor 442 is connected to a conductor 446 which is also connected to one of the collector electrodes of PNP double collector transistor 412. The anodes of diodes 448 and 450 are likewise connected to the conductor 446. The cathodes of diodes 430 and 450 are both connected to the base of transistor 434 and the cathode of diode 448 is connected to the base of NPN transistor 454. The collector of transistor 454 is connected to one of the collector electrodes of transistor 412 by conductor 460 and to the base of NPN transistor 456. A resistor 458 connects the base of transistor 456 and the collector of transistor 454 to ground. The emitters of transistors 454 and 456 are both grounded.

The transistor 418 performs the same function in regard to transistor 414 as the transistor 136 did to transistor 138. Thus, transistor 418 controls the base voltage of transistor 414 such that constant collector current is maintained out of the two collectors of transistor 414 and its base voltage is maintained substantially constant.

Further, transistor 412 has a constant base voltage since it is connected to the base of transistor 414 by conductor 416.

The operation of the under-voltage comparator, the latch and latch control circuit and the field current sensing circuit will now be described. In regard to the under-voltage comparator 52, it has been pointed out that it compares the voltages on conductors 126 and 174 and when the battery voltage drops an amount that is indicative of an under-voltage condition the transistor 378 will be biased on. During normal battery charging conditions the transistor 378 is biased nonconductive. Whenever transistor 378 is biased nonconductive it controls the bias on transistors 412, 414 and 418 such that transistors 412 and 414 are nonconducting with the result that there is no output voltage on the collectors of these transistors. In effect, with no battery under-voltage condition voltage supply is cut off to the latch and latch control circuit because transistors 412 and 414 are nonconductive.

The transistor 400 is biased conductive to lower the voltage on conductor 446 whenever the field current is below the predetermined minimum value. When field current is above the predetermined value the transistor 400 is biased nonconductive.

As long as the output voltage appearing at junction 30 is higher than the value corresponding to an under-voltage condition the signal lamp 94 will not be energized through the switching action of transistor 456 because under this condition of operation both transistors 412 and 414 are nonconducting so that no voltage can be applied to conductor 460 to drive transistor 456 conductive. Therefore, the latch and latch control circuit 86 in effect is deenergized when there is no under-voltage.

The signal lamp 94 will be energized to indicate a fault condition whenever an under-voltage condition and a low field current condition occur simultaneously. Further, it is desirable that the signal lamp 94 be latched to a conductive condition when a drop in field current occurs subsequent to the concurrent occurrence of an under-voltage condition and normal field current condition that is a field current condition in which the field current exceeds the predetermined amount. Further, the lamp 94 can be latched on in the event that a positive diode 20 of the main bridge rectifier 18 opens. If a positive diode opens the voltage output from diode trio 32 will periodically go to a high level at the output frequency of the alternating current generator when one of the diodes 32 conducts that is connected to the anode of the open diodes 20. When this occurs voltage spikes appearing on conductor 148 periodically trigger the Zener diode 314 conductive thereby biasing transistor 341 conductive through biasing resistors 337 and 339. The conductive condition of transistor 341 lowers the voltage of conductor 446 in the same manner as occurs when transistor 400 conducts due to the low field current since the collector of transistor 341 is connected to conductor 446 by conductor 447. In summary, the latch and latch control circuit will latch the lamp 94 energized when the simultaneous occurrence of an under-voltage condition as sensed by comparator 52 and an open positive diode causing periodic conduction of Zener diode 314. Further, the signal lamp 94 will be latched energized during the simultaneous occurrence of an under-voltage condition and low field current providing the system has been previously operating with an under-voltage condition and normal field current.

Assuming now that an under-voltage condition exists with field current above the predetermined value (normal field current) the transistor 400 is biased non-conductive and transistors 412 and 414 are biased to conduct. The collector voltages of transistor 412 are applied respectively to line 446 and the collector of transistor 454 whereas one of the collector electrodes of the double collector transistor 414 applies a high voltage to conductor 470. The collector of transistor 412, connected to conductor 460, will also apply a voltage to the base of transistor 456. Since field current is adequate there will be no fault indication by the system. In this condition of operation the voltage on conductor 446 is high with the result that transistor 434 is biased conductive through diode 450. With transistor 434 conducting transistor 422 is biased nonconductive so that the high voltage on conductor 470 can now maintain transistor 434 biased conductive. During this condition of operation transistor 440 is biased to conduct which in turn shuts off transistor 442.

Assuming now that an under-voltage condition exists, as detected by comparator 52, and that the field current through resistor 290 is below the predetermined value (low field current condition) transistor 400 will be biased conductive lowering the voltage on conductor 446 and in turn lowering the voltage on the base of transistor 454 through diode 448. The transistor 454 will now be biased nonconductive causing the transistor 456 to be biased conductive via the voltage fed thereto through conductor 460 which is coupled to one of the collector electrodes of transistor 412. With transistor 456 conductive the voltage on conductor 232 is lowered to such a value as to cause the signal lamp 94 to be energized. It is noted that the just described condition required both an under-voltage condition and low field current. The low field current condition caused transistor 400 to conduct whereas the under-voltage condition caused the development of collector voltage on the collectors of transistor 412 one of which is connected to conductor 460. This does not necessarily latch the lamp 94 on as will be explained but the lamp is energized as long as there is concurrent low field current and under-voltage.

If the condition of operation in which there is under-voltage and normal field current is followed up by a drop in field current below the predetermined value the circuitry will become latched to maintain the signal lamp 94 energized. Thus, assuming a drop in field current below the predetermined value the voltage of conductor 446 drops. This does not shut off transistor 434 since it is now maintained conductive due to the high voltage on conductor 470. Since transistor 434 does not shut off it maintains transistor 422 nonconducting to prevent the voltage on conductor 470 from being shunted to ground by transistor 422. When the voltage on conductor 446 dropped transistor 440 is biased nonconductive causing transistor 442 to conduct. Transistor 442 is now maintained in conductive condition through the circuit from line 470, diode 432 and the base emitter circuit of transistor 442. This maintains the voltage on the conductor 446 in a low condition since the collector-emitter circuit of transistor 442 is connected between conductor 446 and ground. Since conductor 446 has a low voltage transistor 454 is biased nonconductive with the result that transistor 456 is biased to conduct from the collector of transistor 412 connected to line 460. The lamp 94 can now be maintained energized (latched on) regardless of changes in field current as long as there is an under-voltage condition as sensed by comparator 52. The mode of operation just described will cause the lamp 94 to be latched energized providing the system had previously been operating with under-voltage and field current above the predetermined value.

If the system had responded to what appears to be an initial fault condition, that is concurrent under-voltage and low field current, when the system was first energized the lamp 94 will not be latched on until the system reverts to a normal condition (under-voltage and normal field current) followed by the fault condition. One example of this is a situation in which the battery 26 is discharged to the point that when the system is initially energized, prior to starting the engine that drives alternator 10, the low battery voltage causes the under-voltage comparator 52 to provide high voltages on conductors 470, 446 and 460. This is a condition which is not a true fault condition and the lamp 94 is therefore not latched on. During initial excitation of the field winding the field current is low so that the current sensing circuit indicates a lower field current than the predetermined value. Since field current is low the voltage of conductor 446 is low. Further, when the sysem is first turned on transistor 422 is biased conductive through resistor 426 and the base-emitter circuit of transistor 422. As a result the voltage of conductor 470 is held to a low value due to conductance of transistor 422 in its collector-emitter circuit and transistor 434 is not biased conductive nor can transistor 442 be biased to conduct. In this condition of operation the lamp 94 will be energized because transistor 454 is biased nonconductive causing transistor 456 to conduct from the collector of transistor 412 coupled to line 460 but the lamp is not latched on since transistor 442 is not biased conductive.

When the generating system now becomes operable, that is after the engine is started and driving the generator 10, and assuming that the field current returns to normal and with an under-voltage condition, the voltage on conductor 446 will rise turning on transistor 434 through diode 450 and turning off transistor 422. The signal lamp 94 will now be extinguished but should another drop in field current now occur while the system is in its under-voltage state of operation the transistor 442 is latched conductive causing a continuous latched on energization of the signal lamp 94.

The simultaneous occurrence of under-voltage as detected by comparator 52 and conduction of transistor 341 caused by voltage spikes being applied to conductor 148 due to an open diode 20 will cause the transistor 456 to be latched on and therefore cause the lamp 94 to be latched on. With an open positive diode 20 the battery is being undercharged and eventually the voltage at junction 30 will drop to the under-voltage condition thereby causing a voltage input to the latch circuit 86. Thus, should one of the diodes 20 open, Zener diode 314 is caused to periodically conduct biasing transistor 341 periodically conductive. This lowers the voltage on conductor 446 causing a series of events which, together with an under-voltage condition, biases transistor 454 nonconductive and transistor 456 conductive with resultant signal lamp energization. During this mode of operation the voltage on conductor 470 is high to maintain transistor 442 conductive after the first voltage spike occurs so that even if the voltage spikes terminate the signal lamp 94 is latched on.

The Zener diode 314 responds to the voltage on conductor 148 of over 24 volts as when junctions 24 and 30 become disconnected. During this mode of operation transistor 322 is biased to conduct to cause energization of the signal lamp. If the sensing terminal S of the regulator is disconnected from junction 30 the lamp 94 will be energized since now there is no input voltage to transistors 192, 226 and 216 so that transistor 216 cannot be biased on. If junctions 24 and 30 become disconnected the high voltage applied to conductor 148 of 24 volts may cause the latch and latch control circuit to operate to latch the lamp 94 conductive. This will occur if the battery voltage drops to a value sufficient to cause the under-voltage comparator 52 to energize the latch and latch control circuit 86.

The voltage regulator of this invention is preferably manufactured as an integrated circuit utilizing a thick film substrate and a flip chip integrated circuit and may be packaged in a manner similar to that disclosed in the above-mentioned patent to Cheetham et al., U.S. Pat. No. 3,538,362.

It is important, in the operation of the voltage regulator that has been described, that the voltages provided to operate the comparators be temperature compensated so that they will properly respond to various fault conditions. Further, the characteristics of Zener diodes, for example Zener diode 170 utilized in the system, can vary in break down voltage rating during manufacture of the integrated circuit. As will be described, the voltage regulator of this invention will operate properly under varying temperature conditions and the system is arranged such that the resistor 110 can be trimmed to a value to properly match the characteristics of the Zener diode 170 and when this is accomplished all components that respond to the Zener voltage and battery voltage are properly set as to voltage responsive differentials.

The voltages of conductors 126 and 174, which are used to operate the various comparators of the regulator, vary in the same direction with changes in regulator temperature so that they track each other. The voltage applied to conductor 174 will vary as the break down voltage of Zener diode 170 varies. The break down voltage of the Zener diode 170 increases with increasing regulator temperature so that the voltage on conductor 174 partakes of this voltage increase. The voltage on conductor 126, however, also increases with increasing regulator temperature. Thus, as temperature of the regulator increases the voltage drop across the base-emitter of transistor 120 decreases so that the voltage on conductor 126 increases with an increase in temperature for a given voltage on junction 116. It will, of course, be appreciated that the voltage on conductor 126 will additionally vary as a function of the voltage on junction 30 as further modified by the negative temperature coefficient thermistor 115. The voltages on conductors 126 and 174 likewise track each other with decreasing regulator temperature.

The voltage on conductor 162, which is utilized to feed bias voltages to certain portions of the regulator, remains substantially constant with changes in regulator temperature. This voltage, insofar as temperature considerations are concerned, will be related to the break down voltage of the Zener diode 170 and the base-emitter voltage drop of transistor 134. The voltage on conductor 166 will increase with temperature due to the temperature dependent characteristic of Zener diode 170 but this effect is offset by the lower voltage drop of the base-emitter of transistor 134 with increasing temperature. Thus, for a given input voltage on conductor 142 the voltage on conductor 162 will remain substantially constant with variations in temperature. The voltage on conductor 162 is substantially equal to the Zener break down voltage of Zener diode 170 plus the base-emitter voltage drop of transistor 134, this sum being multiplied by the voltage divider ratio of resistors 158 and 160. The resistor 160 is made approximately four times the resistance value of resistor 158 with the result that the voltage on conductor 162 is substantially equal to 1.25 times the sum of the Zener break down voltage of Zener diode 170 and the base-emitter voltage drop of transistor 134. This means that the electrodes of the transistors coupled to lines 162 and 180 will have a substantially constant voltage with varying temperature. Further, as pointed out, components of the system coupled respectively to line 126 and line 174 will have voltages applied thereto which vary in the same direction with changes in temperature.

As pointed out, the system can be properly calibrated by trimming the resistor 110 to match the break down voltage of the Zener diode 170. During the manufacture of the integrated circuit of the voltage regulator the semiconductor components, except for lamp driver 210, are formed on a single chip and it is possible that the break down voltages of the Zener diode 170 may vary from one voltage regulator to another. The break down voltage of Zener diode 170 determines the voltage set point of the regulation comparator 68 as well as providing reference voltages to both the under-voltage comparator 52 and the over-voltage comparator 50. Thus, the voltage on conductor 174 will be the particular break down voltage of Zener diode 170.

In regard to the trimming of resistor 110 to adjust the regulator for proper operation, it should be remembered that the regulated voltage on conductor 162, provided by internal regulator 54, is a function of the particular Zener break down voltage of Zener diode 170. With respect to the under-voltage comparator 52, the regulated voltage on conductor 162 is applied to conductor 184 and ground and is therefore applied to the series combination of resistor 370, resistor 372 and emitter-collector circuit of transistor 374. By way of example, resistor 370 may be 6540 ohms and resistor 372 1240 ohms. The voltage at junction 371 will be a function of the particular break down voltage of Zener diode 170 since the regulated voltage between conductor 184 and ground varies with the break down voltage of Zener diode 170. Further, the voltage at junction 371 will be a function of the voltage of junction 116 since the voltage of the emitter of transistor 374 varies as the voltage at junction 384 varies. Thus, the voltage at the emitter of transistor 374 will be approximately the voltage of junction 384 increased by the voltage drop across the emitter-base circuit of transistor 374. The voltage of junction 384, as previously pointed out, is the voltage of junction 116 less the voltage drop across the base-emitter of transistor 120. In summary, the voltage across resistors 370 and 372 will be the output voltage of internal regulator 54 applied between conductors 184 and ground less the voltage of the emitter of transistor 374. This voltage is divided by resistors 370 and 372 to provide the voltage at junction 371. Therefore, the voltage at junction 371 is a function of the output voltage of internal regulator 54 and the voltage of junction 116. As previously mentioned, the output voltage of regulator 54 depends on the break down voltage of Zener diode 170.

In order to set the regulator to proper set points to match the particular break down voltage of Zener diode 170, a fixed voltage of, for example, 14.3 volts may be applied between the sense terminal S and ground. The field circuit between terminal F+ and ground is energized and the resistance of resistor 110 is then increased by a trimming operation until the regulation comparator 68 is actuated to drive the Darlington connected transistors 284 and 288 nonconductive and the consequent reduction in field current then indicates that the resistor 110 is of a proper value. As the resistance of resistor 110 is being increased the voltage divider ratio of the resistances connected to opposite sides of junction 116 is varied so that the voltage at junction 116 will decrease for a given voltage applied to the sensing circuit. Further, the voltage at the emitter of transistor 374 will vary for a given input voltage since it follows the voltage of junction 116. When the trimming operation of resistor 110 is completed the voltage regulator is properly set to match the break down voltage of Zener diode 170. In this regard, it is again noted that the regulated output voltage of the internal regulator 54, which is a function of the break down voltage of Zener diode 170, is applied across resistors 370, 372 and the transistor 374.

During this trimming operation the over-voltage comparator 50 is properly set to match the voltage break down characteristic of the Zener diode 170. This is accomplished because the over-voltage comparator is supplied with a regulated direct voltage on conductor 162 from the internal regulator through the emitter-base of transistor 192, resistor 202, collector-emitter circuit of transistor 198 and resistor 200. Further, the adjustment of the resistance of resistor 110 varies the base voltage of transistor 194 for a given input voltage in the same manner as the base voltage of transistor 374 is varied as the voltage divider ratio of the sensing circuit is adjusted.

The purpose of resistor 381 is to provide a current path to ground in parallel with Zener diode 170 in the event that the voltage on conductor 162 drops below the break down voltage of the Zener diode 170 so as to ensure proper operation of the under-voltage comparator during this condition of operation.

It has been previously pointed out that the switching of Darlington connected transistors 284 and 288 is controlled by the switching of transistors 272 and 270. Thus, when the Darlington connected transistors are to be switched on transistor 272 is biased conductive and transistor 270 nonconductive. When it is desired to shut off transistors 284 and 288 transistor 272 is biased nonconductive and transistor 270 conductive. This arrangement has advantages as compared to the voltage regulating systems of the type disclosed in the U.S. Pat. Nos. to Harland, Jr. et al., 3,469,168 and to Hanson et al., 3,643,153. In the regulating systems disclosed in those patents the base-emitter of the output transistor is shunted by the collector-emitter of a driver transistor and the base of the output transistor is connected to a resistor which supplies base current to the output transistor when the driver transistor is nonconductive and which supplies collector current to the driver transistor when it is conductive. The voltage regulator of this invention uses a resistor 280 which carries the base-emitter current of transistors 284 and 288. However, when transistor 272 is biased nonconductive there is no current flow through resistor 280. As a result heat is only generated in resistor 280 during the time period when transistors 284 and 288 are biased conductive as opposed to the systems disclosed in the above-referenced Harland and Hanson et al. patents where the resistor is energized both during turn on and turn off periods of the output transistor. It is important to keep heat generation to a minimum since the single chip that forms the regulator is mounted on a ceramic substrate which also carries the thick film resistors.

Further, it is known that as the temperature of the voltage regulator increases less base current is required in order to bias transistors 284 and 288 conductive. In some regulators, for example in the regulator of above-referenced U.S. Pat. No. 3,643,153, a thermistor is connected across the base-emitter circuit of the output transistor in order to ensure a shut off condition of the output transistor when it should be shut off. The voltage regulator of this invention does not require such a thermistor because during the condition of operation in which transistors 284 and 288 are shut off the transistor 270 is biased conductive and serves to shunt any collector-base current of transistor 284 to ground which otherwise might tend to switch the output Darlington connected transistors conductive when they should be nonconductive.

In the operation of the system of this invention the driver of the motor vehicle, when starting up the vehicle engine, closes the ignition switch 102. The closure of ignition switch 102 provides a current path for initially exciting field winding 14 from battery 26 through the switch 102, conductor 98, resistor 100 which may be, for example, 20 ohms, the F+ terminal, field winding 14, the collector-emitter circuit of transistor 288 and the small resistor 290. At this time transistors 284 and 288 are biased conductive because the voltage between junction 30 and ground, which is battery voltage, is lower than a desired regulated value causing the regulation comparator 68 to drive the transistors 284 and 288 conductive. At this time signal lamp 94 is energized through conducting transistor 210. The transistor 210 is biased conductive by battery voltage via resistor 100, the F+ terminal and resistor 212 which may be for example in the order of 500 ohms and by conducting transistor 218. In this condition of operation, it should be mentioned that forward bias is applied to the base-emitter circuits of transistors 284 and 288 via resistor 280 which may be, for example, 400 ohms and the collector-emitter circuit of transistor 272.

When the engine starts to thereby drive generator 10, and assuming normal operation of the voltage regulating system, the signal lamp 94 is deenergized when transistor 210 is biased nonconductive. Thus, the output voltage at the collector of transistor 192, connected to the base-emitter circuits of transistors 226 and 216 through resistor 230, biases these transistors conductive thus shunting the base-emitter of transistor 210 to bias it nonconductive.

The system will now operate to regulate the output voltage of the generator and to provide various fault indications as they may occur in a manner that has been previously described. The motor vehicle electrical system has loads (not illustrated) in addition to battery 26 which are connected between junction 30 and ground.

The embodiments of the invention in which an exclusive property or privilege is claimed are defined as follows:

1. A voltage regulator for a motor vehicle battery charging system that includes an alternating current generator having an output winding and a field winding, a first rectifier means connected to said output winding having direct voltage output terminals, a battery connected across said output terminals of said first rectifier means and second rectifier means connected to said output winding having field energizing terminals providing a direct field energizing voltage comprising, transistor switching means having a collector-emitter circuit adapted to be connected in series with the field winding of said generator, first and second conductor means adapted to be connected with said field energizing terminals, first and second transistors for controlling the switching of said transistor switching means, a resistor, means connecting said resistor, the collector-emitter circuit of said first transistor and the base-emitter circuit of said transistor switching means in series and across said conductor means, means connecting the collector-emitter circuit of said second transistor in shunt with the base-emitter circuit of said transistor switching means, said first transistor when conductive providing base drive for said transistor switching means through said resistor and said second transistor when conductive bypassing the base-emitter circuit of said transistor switching means, voltage comparator means, means connecting the output of said voltage comparator means with the base electrodes of said first and second transistors such that said comparator can operate said transistors to a first state in which said first transistor is conductive and said second transistor is nonconductive or a second state in which said first transistor is nonconductive and second transistor is conductive, a voltage sensing means adapted to be connected across the battery of the vehicle charging system, means connected to said voltage sensing means for providing a reference voltage, said sensing means providing a battery voltage that is a function of sensed battery voltage, means for applying said reference and battery voltages to said comparator means, said comparator means operative to cause said first and second transistors to assume said first state when said battery voltage is less than said reference voltage and to assume said second state when said battery voltage is greater than said reference voltage, third and fourth transistors, means connecting the collector-emitter circuit of said third transistor in shunt with the base-emitter circuit of said first transistor, means connecting the collector-emitter circuit of said fourth transistor in series with the base-emitter circuit of said second transistor, a Zener diode, and means connecting said Zener diode between one of said conductor means and the base electrodes of said third and fourth transistors, said Zener diode being adapted to conduct to thereby bias said third and fourth transistor conductive when the voltage at said field energizing terminals increases to an abnormally high value, the conduction of said third transistor biasing said first transistor nonconductive and the conduction of said fourth transistor biasing said second transistor conductive to thereby bias said transistor switching means nonconductive.

2. A voltage regulated motor vehicle battery charging system comprising, an alternating current generator having an output winding and a field winding, first rectifier means connected to said output winding having direct voltage output terminals, a battery connected across the output terminals of said first rectifier means to be charged thereby, second rectifier means connected to said output winding having first and second field energizing terminals providing a direct field energizing voltage, a voltage regulator having a voltage sensing circuit connected across said battery, first transistor switching means connected in series with said field winding across said field energizing terminals, a voltage responsive control circuit coupled to said voltage sensing circuit and to said transistor switching means for controlling the operation of said transistor switching means to control field current, a second transistor having its collector-emitter circuit connected between said voltage sensing circuit and said control circuit, first voltage responsive means connected to said second transistor for causing said second transistor to be biased conductive when a voltage is applied to said first voltage responsive means that exceeds a predetermined value, a circuit including a manually operable switch and a resistor connected in series between said battery and said first field energizing terminal, a signal lamp, a third transistor connected to said signal lamp operative when conductive to cause said signal lamp to be energized from said battery through said manually operable switch when it is closed, second voltage responsive means, means coupling said second voltage responsive means to said third transistor such that said third transistor is biased conductive to energize said lamp when the voltage sensed by said second voltage responsive means is below a predetermined value, and means connecting said first field terminal to said first and second voltage responsive means for applying a voltage to said first voltage responsive means which is high enough to cause said second transistor to be biased conductive but which is low enough to cause said second voltage responsive means to bias said third transistor conductive to energize said signal lamp, the conduction of said second transistor operative to energize said control circuit to thereby cause a forward bias to be applied to said first transistor switching means to cause it to conduct whereby during initial excitation of said system, when said manually operable switch is closed, said signal lamp is energized and said field winding is initially excited from said battery through said resistor, the voltage at said first field terminal rising to a value sufficient to cause said second voltage responsive means to deenergize said signal lamp when the generator develops a predetermined output voltage.

* * * * *